United States Patent
Hiebenthal et al.

(10) Patent No.: US 10,252,630 B2
(45) Date of Patent: Apr. 9, 2019

(54) RETRACTABLE CABLE OR HOSE SYSTEM

(71) Applicant: Conductix, Inc., Omaha, NE (US)

(72) Inventors: Benjamin B. Hiebenthal, Fremont, NE (US); Martin Blair, Gretna, NE (US); Roger Thorpe, Omaha, NE (US)

(73) Assignee: Conductix, Inc., Omaha, NE (US)

( * ) Notice: Subject to any disclaimer, the term of this patent is extended or adjusted under 35 U.S.C. 154(b) by 68 days.

(21) Appl. No.: 15/409,112

(22) Filed: Jan. 18, 2017

(65) Prior Publication Data
US 2017/0203662 A1 Jul. 20, 2017

Related U.S. Application Data

(60) Provisional application No. 62/279,952, filed on Jan. 18, 2016.

(51) Int. Cl.
*B60L 11/18* (2006.01)
*B65H 75/36* (2006.01)

(52) U.S. Cl.
CPC ....... *B60L 11/1816* (2013.01); *B60L 11/1825* (2013.01); *B65H 75/368* (2013.01); *B60L 2230/10* (2013.01); *B60L 2230/12* (2013.01); *B65H 2701/33* (2013.01); *B65H 2701/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
USPC ......................................................... 320/109
See application file for complete search history.

(56) References Cited

U.S. PATENT DOCUMENTS

| | | | |
|---|---|---|---|
| 2012/0048983 A1* | 3/2012 | Bianco | B60L 11/1818 242/388.9 |
| 2014/0201905 A1* | 7/2014 | Glukhovsky | A61G 7/1001 5/81.1 R |
| 2014/0201906 A1* | 7/2014 | Erturk | A61G 7/1001 5/81.1 R |
| 2017/0196752 A1* | 7/2017 | Behnke | A61H 3/008 |
| 2017/0203662 A1* | 7/2017 | Hiebenthal | B60L 11/1816 |

\* cited by examiner

*Primary Examiner* — Mohammed Alam
(74) *Attorney, Agent, or Firm* — Ryan T. Grace; Advent, LLP

(57) ABSTRACT

A retractable cable or hose station can include a guide with a first pulley fixed with respect to a longitudinally extending track. The retractable cable or hose station can also include a trolley configured to travel along the track, where the trolley has at least a second pulley to be positioned in a line with the first pulley generally parallel to the longitudinally extending track. The retractable cable or hose station can also include a flexible cable or hose configured to be looped around the first pulley and the second pulley so that the trolley can be pulled toward the first pulley when a free end of the flexible cable or hose is pulled away from the first pulley. The retractable cable or hose station can include a biasing mechanism for biasing the trolley away from the first pulley to tighten and retract the flexible cable or hose.

19 Claims, 8 Drawing Sheets

RETRACTABLE CABLE OR HOSE SYSTEM

RELATED APPLICATIONS

The present application claims the benefit under 35 U.S.C. § 119(e) of U.S. Provisional Application Ser. No. 62/279,952, filed Jan. 18, 2016, and titled "RETRACTABLE CABLE OR HOSE SYSTEM," which is herein incorporated by reference in its entirety.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to retractable cable or hose stations. A retractable cable or hose station can include a guide with a first pulley fixed with respect to a longitudinally extending track (e.g., a frame, a beam). The retractable cable or hose station can also include a trolley configured to travel along the track, where the trolley has at least a second pulley to be positioned in a line with the first pulley generally parallel to the longitudinally extending track. The retractable cable or hose station can also include a flexible cable or hose configured to be looped around the first pulley and the second pulley so that the trolley can be pulled toward the first pulley when a free end of the flexible cable or hose is pulled away from the first pulley. The retractable cable or hose station can include a biasing mechanism (e.g., an elastic cord, a spring, an electric actuator, a pneumatic actuator, a hydraulic actuator, a weight) for biasing the trolley away from the first pulley to tighten and retract the flexible cable or hose. A retractable cable or hose station can also include a ratchet that allows continuous motion of the trolley only toward the first pulley while preventing continuous motion of the trolley away from the first pulley. The retractable cable or hose station can also include one or more dampeners (e.g., a linear shock absorber, an eddy current brake) for dampening motion of the first pulley, the second pulley, and/or the trolley.

DRAWINGS

The Detailed Description is described with reference to the accompanying figures.

DETAILED DESCRIPTION

Figure 1:
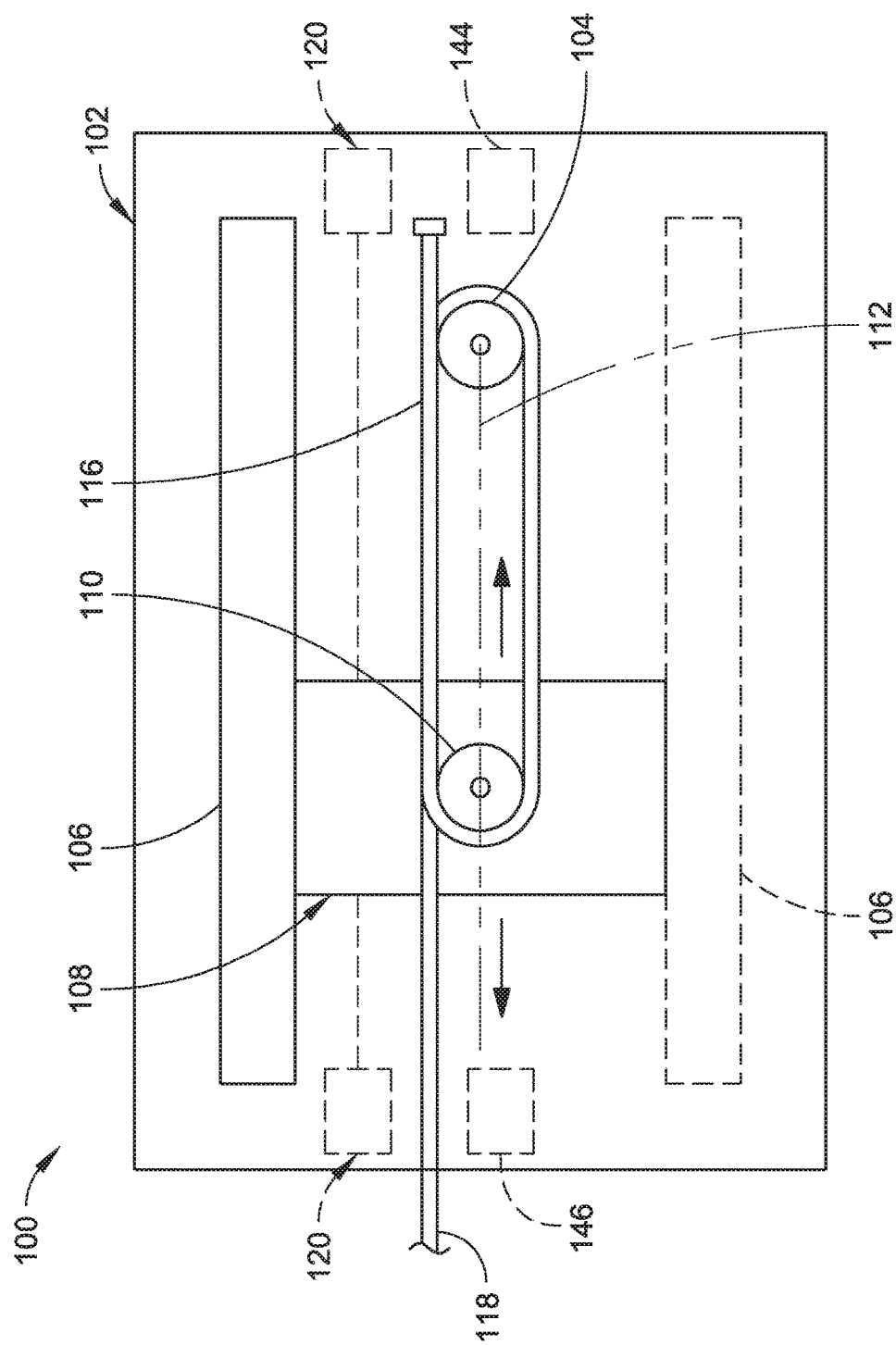
FIG. 1 is a diagrammatic illustration of a retractable cable or hose station in accordance with example embodiments of the present disclosure.
Figure 2:
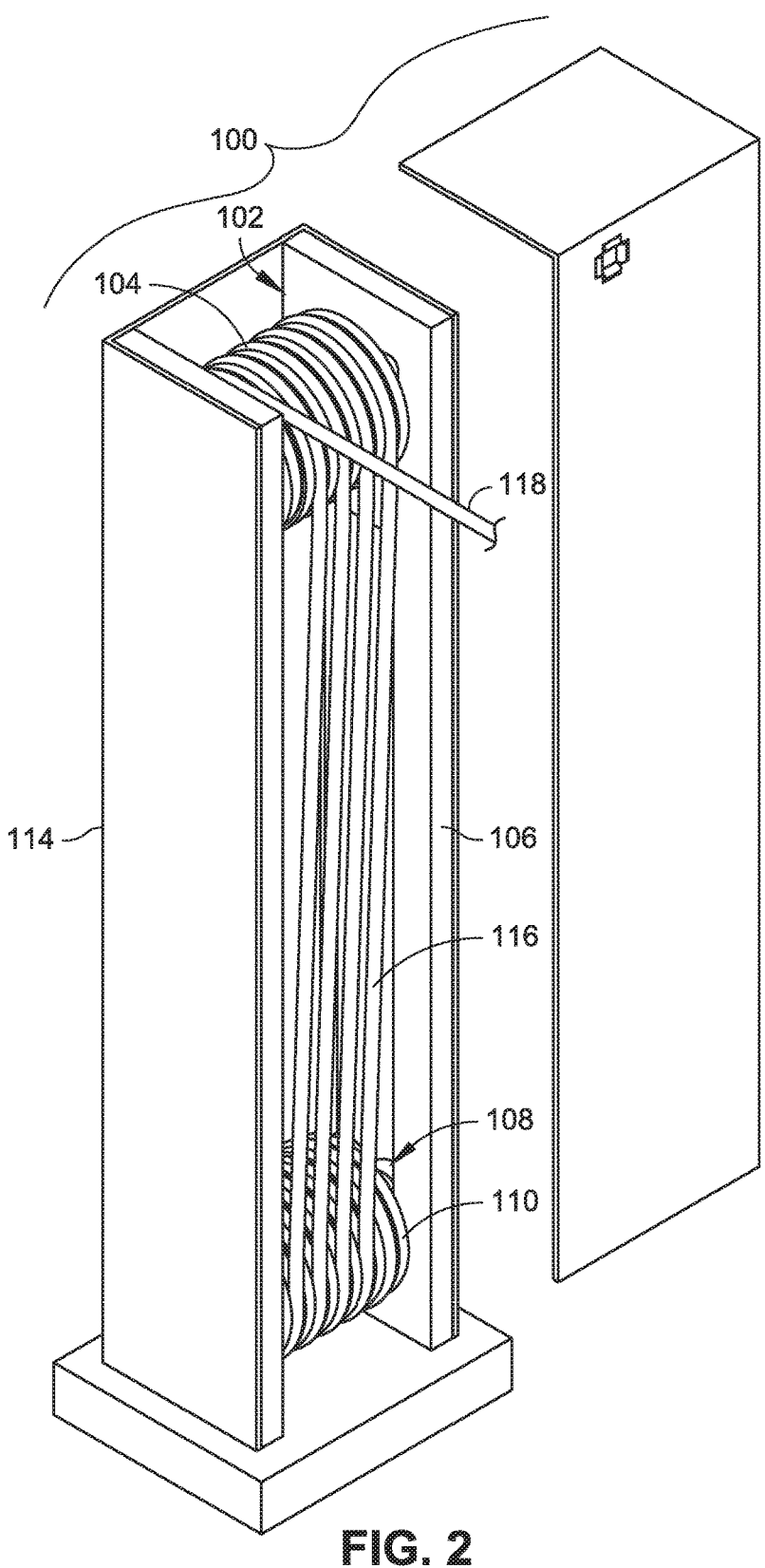
FIG. 2 is an exploded isometric view illustrating a retractable cable or hose station in accordance with an example embodiment of the present disclosure, where a cable or hose is shown in a retracted orientation.
Figure 3:
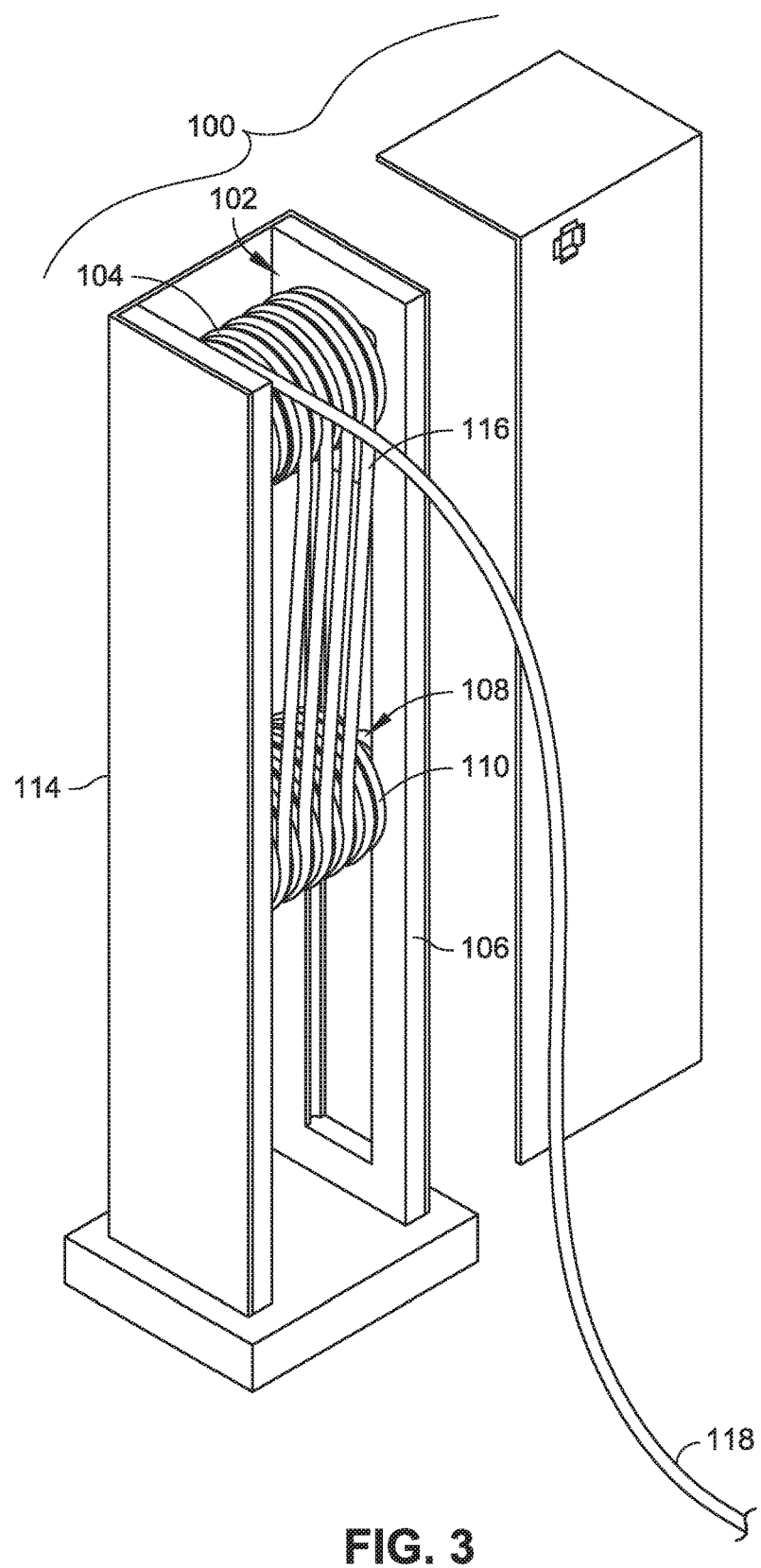
FIG. 3 is an exploded isometric view of the retractable cable or hose station illustrated in FIG. 2, where the cable or hose is shown in an extended orientation.
Figure 4:
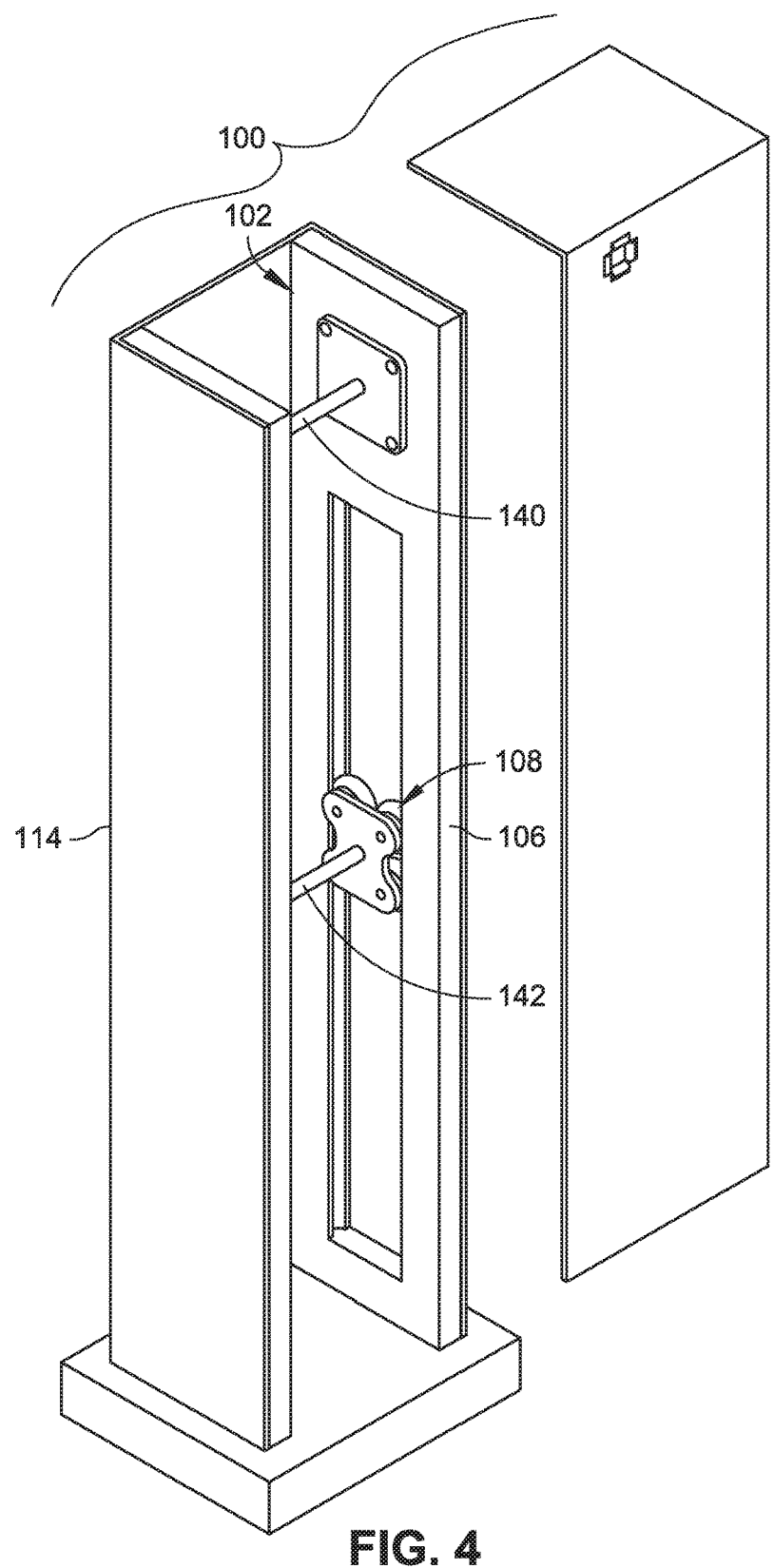
FIG. 4 is a partial exploded isometric view of the retractable cable or hose station illustrated in FIG. 2.
Figure 5:
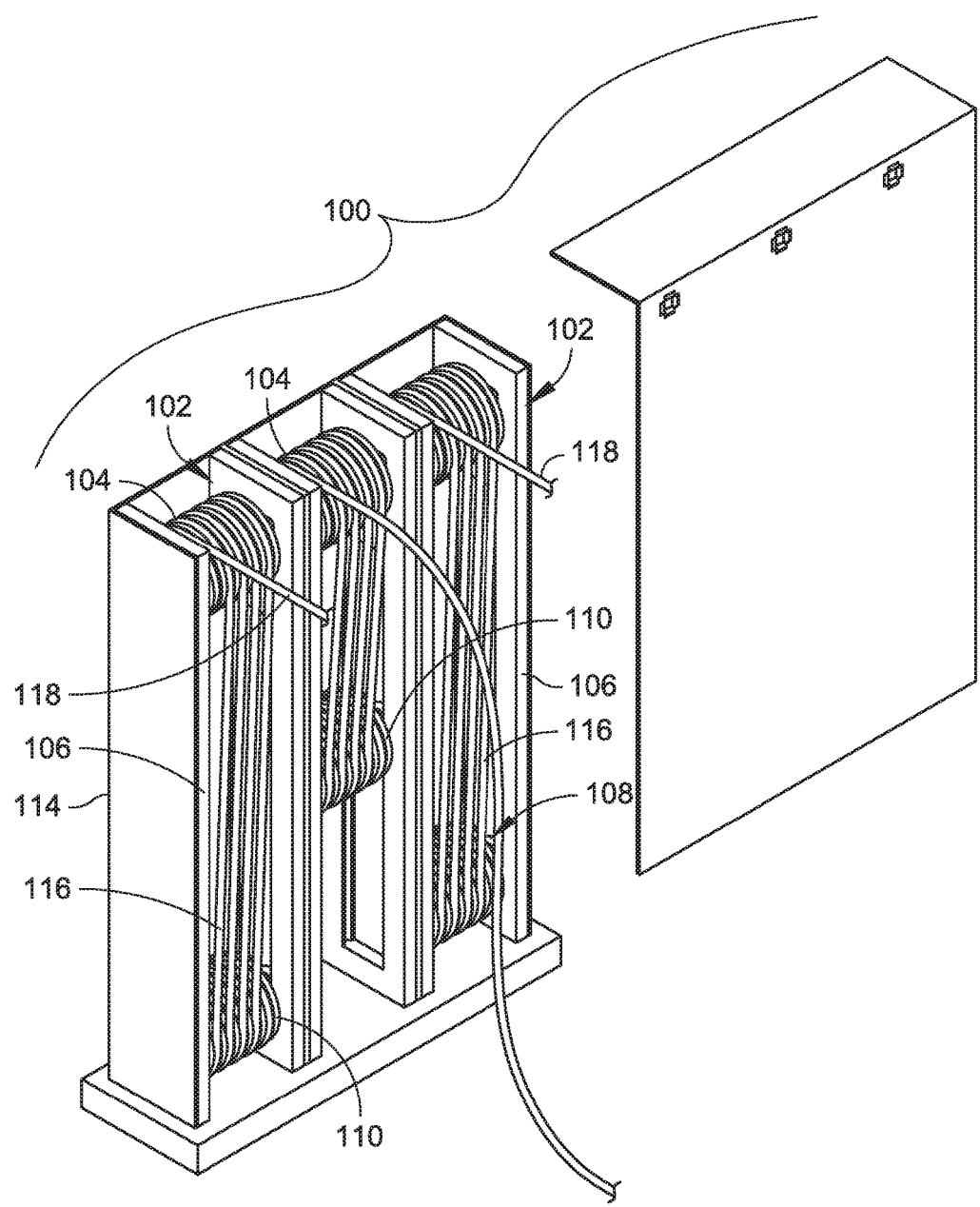
FIG. 5 is an exploded isometric view illustrating another retractable cable or hose station in accordance with an example embodiment of the present disclosure, where multiple cables or hoses are provided.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

A cable reel in the form of a round drum, such as a spool, can be used to carry and/or support various types of electrical wires. For example, a cable reel can be used with a charging station for an electrical vehicle (e.g., as a cable management system). While it is often desirable that such a charging station have a small footprint and not be intrusive, the size of a cable reel is generally dictated by the spool size needed to wrap up and store the cable, which then determines the overall footprint of the charging station. Further, the charger interface and cable outlet of a charging station are typically raised from the ground (e.g., to a comfortable user height) on a base which is typically empty.

Referring generally to FIGS. 1 through 9, retractable cable or hose stations 100 are described. In embodiments of the disclosure, a retractable cable or hose station 100 can be configured as, for example, an electric vehicle charging station. As described herein, a retractable cable or hose station 100 can include a guide 102 with a first pulley 104 (e.g., a five-inch (5") reel or a seven-inch (7") reel) fixed with respect to one or more longitudinally extending tracks 106. The retractable cable or hose station 100 can also include a trolley 108 configured to travel along a track 106, where the trolley 108 has at least a second pulley 110 (e.g., another five-inch (5") reel or a seven-inch (7") reel) to be positioned in a line 112 with the first pulley 104 generally parallel to the longitudinally extending track 106. In some embodiments, the track 106 can be implemented using a supporting frame 114, such as a vertically oriented housing (e.g., as described with reference to FIGS. 2 through 7), while in other embodiments, the track 106 can be implemented using a beam, such as a horizontally oriented I-beam. However, it should be noted that the frame 114 and the beam are provided by way of example and are not meant to limit the present disclosure. In other embodiments, a guide 102 can be configured using another type of track.

The retractable cable or hose station 100 can also include a flexible cable or hose 116 configured to be looped around the first pulley 104 and the second pulley 110 so that the trolley 108 can be pulled toward the first pulley 104 when a free end 118 of the flexible cable or hose 116 is pulled away from the first pulley 104. An opposite end of the flexible cable or hose 116 can be fixed with respect to the track 106 (e.g., fixed to, for example, the frame 114). In embodiments of the disclosure, the opposite end of the flexible cable or hose 116 can be connected to one or more sources of electrical power (e.g., AC mains), hydraulic fluid, communications signals, fiber optic signals, and so forth. The trolley 108 can be used to control the motion of the free end 118 of the flexible cable or hose 116 (e.g., for retracting and storing the flexible cable or hose 116). Example flexible cables or hoses 116 may include, but are not necessarily limited to: power cables, hydraulic hoses, electrical cables, signal cables, electrical cables with signal cables, fiber optic cables, and so forth.

As described herein, a retractable cable or hose station 100 can be ergonomic to use, and may orient the cable storage space in a variety of orientations (e.g., a horizontal orientation, a vertical orientation, possibly another orientation between horizontal and vertical, and so on). Further, a retractable cable or hose station 100 does not necessarily use a slip ring and may occupy a low profile storage space (e.g., as compared to a cable reel, a hose reel, a festoon, etc.). For example, in a vertical orientation, the overall footprint of a retractable cable or hose station 100 configured as a charging station may be reduced (e.g., with respect to a cable reel) by using the otherwise empty space in the base of the frame 114 and by not rolling the cable into a circle, but rather by using elongated loops.

In some embodiments, the retractable cable or hose station 100 includes one or more biasing mechanisms 120 for biasing the trolley 108 toward and/or away from the first pulley 104. For example, an elastic cord 122, such as a bungee cord, can be attached to the trolley 108, which provides force to tighten and retract the flexible cable or hose 116. In some embodiments, one or more additional pulleys can be used to guide the elastic cord 122 from the trolley 108. However, it should be noted that an elastic cord is provided by way of example and is not meant to limit the present disclosure. In other embodiments, another biasing mechanism 120, such as a spring 124 (e.g., a gas powered spring), can be used to bias the trolley 108 away from the first pulley 104. In some embodiments, one or more of an electric actuator 126 (e.g., a linear motor, a rotary motor), a pneumatic actuator 128, a hydraulic actuator 130, a weight 132, and so forth may also be used.

In some embodiments, two or more biasing mechanisms 120 may be used together to bias a trolley 108 toward and/or away from the first pulley 104. For instance, with reference to FIGS. 6 and 7, two springs 124 can be used to bias the trolley 108 away from the first pulley 104 along with a weight block 132, adding additional tension to the flexible cable or hose 116. In some embodiments, one or more (e.g., two) weight plates 134 can have tab features 136, each defining an aperture into which a bushing 138 (e.g., a plastic bushing) can be inserted. The bushings 138 can then slide along a track 106 configured as, for example, a round guiding rod on each side of the retractable cable or hose station 100. The rods may also serves as a mount for the springs 124.

It should also be noted that in some orientations, a biasing mechanism 120 is not necessarily used to bias the trolley 108 away from the first pulley 104. For example, as described with reference to FIG. 4, the guide 102 can be oriented vertically to position a top shaft 140 and the first pulley 104 stationary with respect to the frame 114 above the trolley 108, and bias a lower shaft 142 and the second pulley 110 away from the first pulley 104 using gravity. In this manner, the lower shaft 142 and the second pulley 110 can hang freely from the flexible cable or hose 116 guided by the tracks 106, and acted on by gravity through, for example, the weight of the lower shaft 142 and its associated second pulley 110 or pulleys, and so forth. However, in other embodiments, a biasing mechanism 120 may still be used to bias the trolley 108 away from the first pulley 104 in a vertical or generally vertical orientation (e.g., using a weight 132 as previously described).

In some embodiments, a retractable cable or hose station 100 can include a locking mechanism, such as a ratchet 144, that can be configured to allow continuous motion of the trolley 108 only toward the first pulley 104 while preventing continuous motion of the trolley 108 away from the first pulley 104. A ratchet 144 can be configured as, for example, a bar or wheel with angled teeth engaged by a pawl, cog, or tooth that allows motion in one direction only. Further, a release mechanism (e.g., to disengage the pawl, cog, or tooth) can be provided to release the trolley 108 and retract the flexible cable or hose 116.

The retractable cable or hose station 100 can also include one or more dampeners 146 for dampening motion of the first pulley 104, the second pulley 110, and/or the trolley 108. A dampener 146 can include, but is not necessarily limited to: a linear dampener, a rotary dampener, a shock absorber 148, an eddy current brake 150, and so forth. It should be noted that while first and second pulleys 104 and 110 are described herein, a retractable cable or hose station 100 can also include additional pulleys (e.g., a third pulley, a fourth pulley, a fifth pulley, etc.), each of which can be fixed with respect to the longitudinally extending track 106 and/or the trolley 108, where the flexible cable or hose 116 can be looped around the first pulley 104, the second pulley 110, and one or more additional pulleys. In this manner, the length of flexible cable or hose 116 available and/or the length of travel of the trolley 108 can be adjusted to accommodate various cable or hose configurations. Further, multiple flexible cables or hoses 116 may also be used (e.g., as described with reference to FIG. 5).

Figure 6:
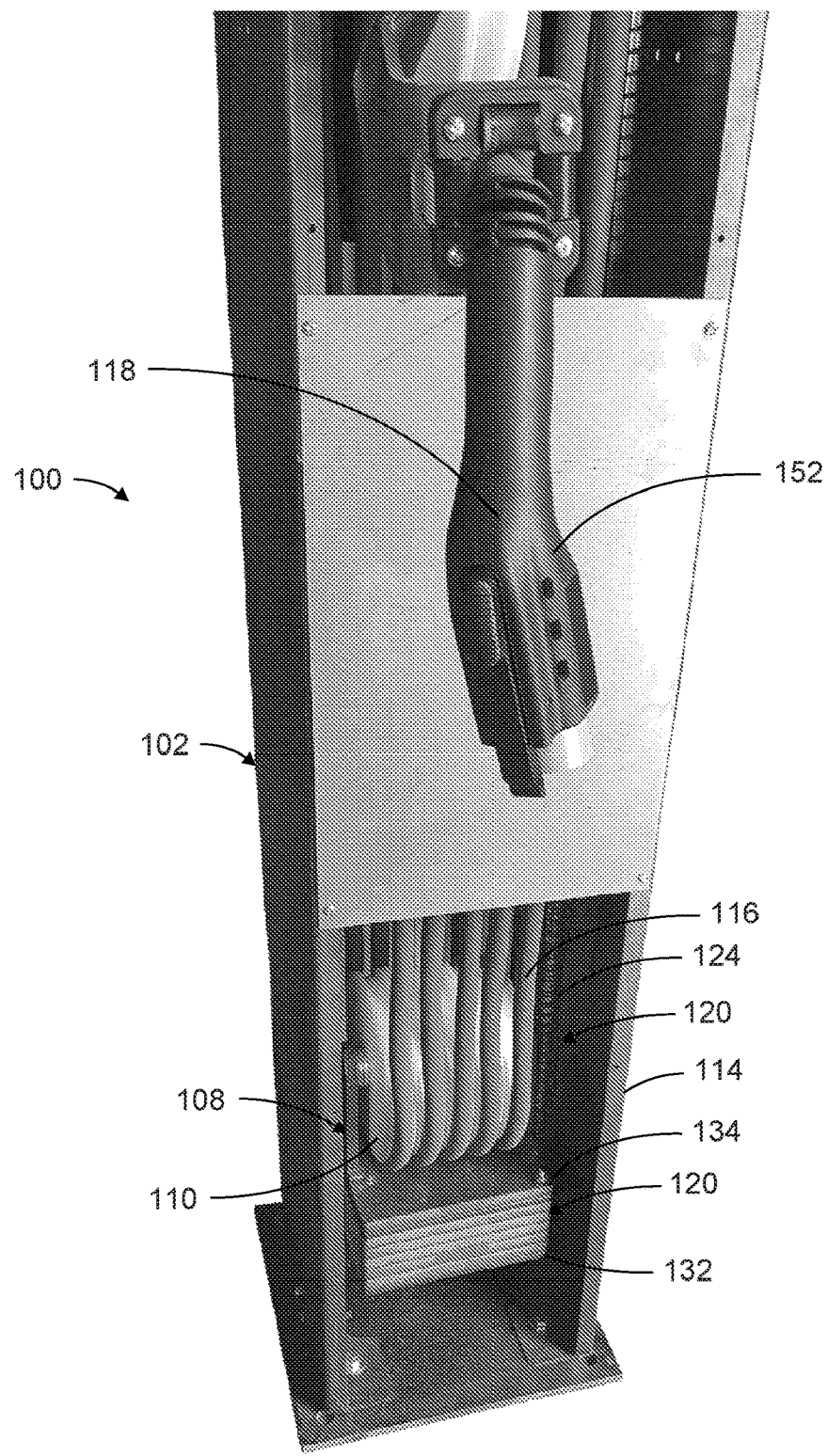
FIG. 6 is a partial perspective view illustrating a further retractable cable or hose station in accordance with an example embodiment of the present disclosure, where a cable or hose is shown in a retracted orientation.
Figure 7:
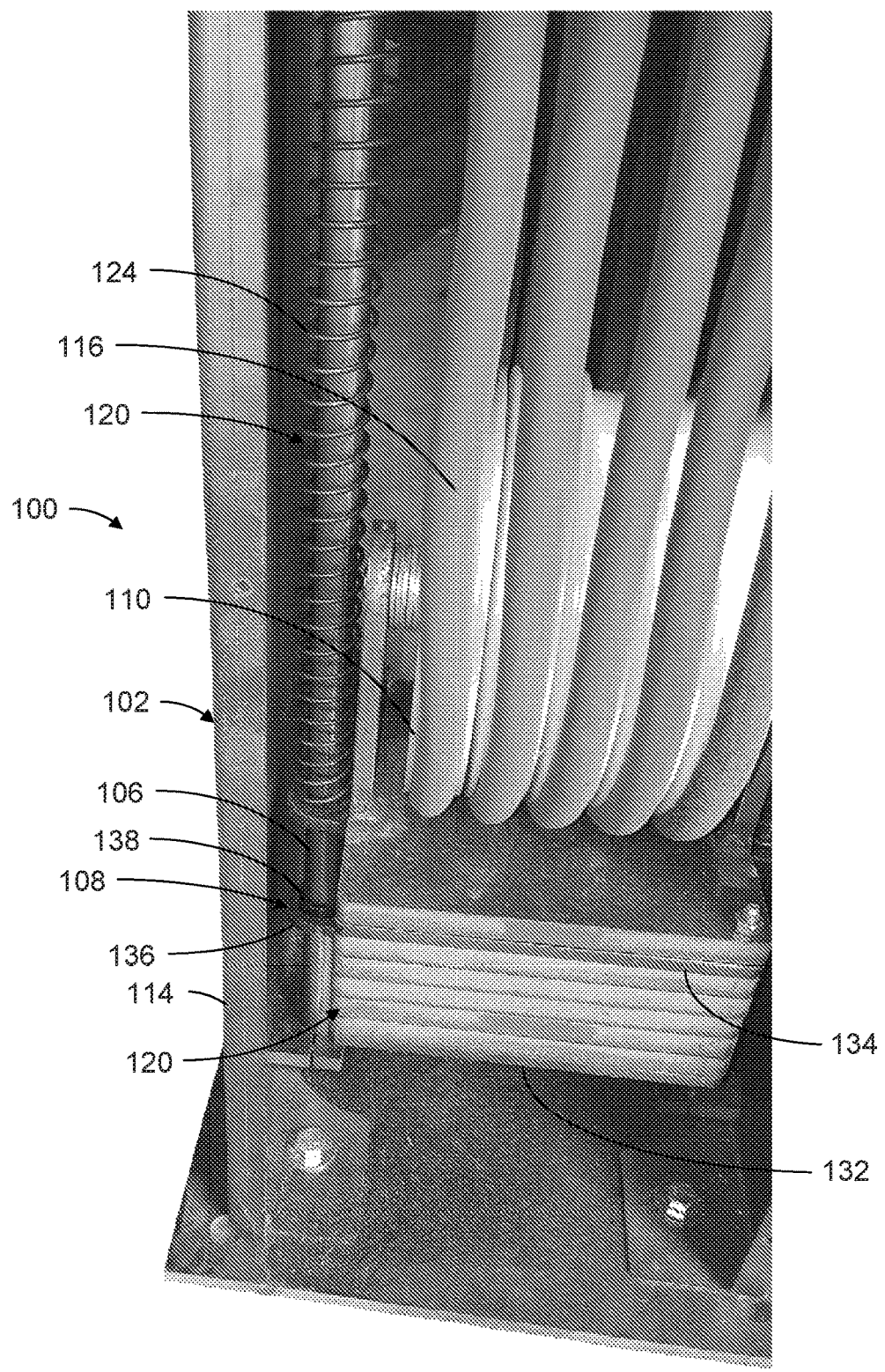
FIG. 7 is a partial perspective view of the retractable cable or hose station illustrated in FIG. 6.
Figure 8:
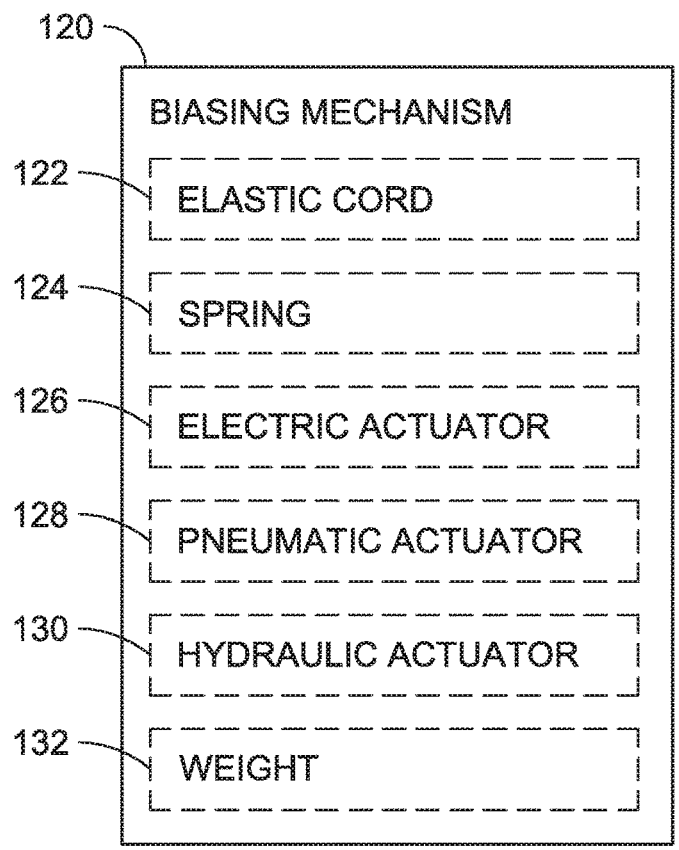
FIG. 8 is a block diagram illustrating biasing devices for a retractable cable or hose station, such as the retractable cable or hose stations illustrated in FIGS. 1 through 7, in accordance with example embodiments of the present disclosure.
Figure 9:
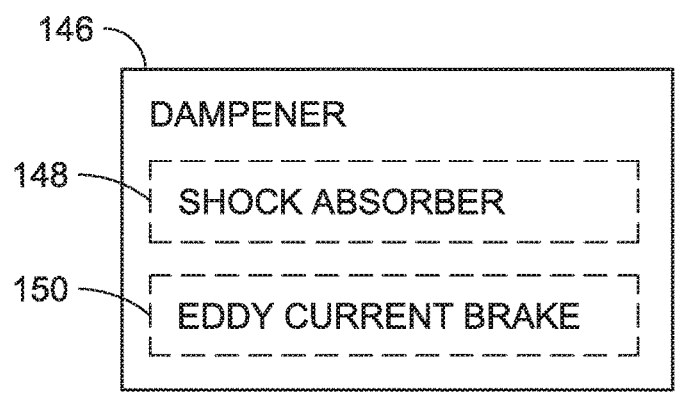
FIG. 9 is a block diagram illustrating dampeners for a retractable cable or hose station, such as the retractable cable or hose stations illustrated in FIGS. 1 through 7, in accordance with example embodiments of the present disclosure.

With reference to FIG. 6, in some embodiments, the free end 118 of one or more flexible cables or hoses 116 may include a connector 152, e.g., an electrical connector such as a plug end for connecting to AC mains, a connector for charging an electric vehicle, and/or one or more other connectors. For example, the free end 118 of a flexible cable or hose 116 may include, but is not necessarily limited to one or more of the following connectors: an SAE J1772 connector, an IEC 62196 connector, a Combined Charging System (CCS) connector, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electric vehicle charging station comprising:
   a guide having a plurality of first pullies fixed with respect to a longitudinally extending track;
   a trolley configured to travel along the longitudinally extending track, the trolley having a plurality of second pullies to be positioned in a line with the plurality of first pullies generally parallel to the longitudinally extending track;
   a flexible cable or hose configured to be separately looped around individual ones of the plurality of first pullies and individual ones of the plurality of second pullies, the trolley configured to be pulled toward the plurality of first pullies when a free end of the flexible cable or hose is pulled away from the plurality of first pullies;

a biasing mechanism for biasing the trolley away from the plurality of first pullies to tighten and retract the flexible cable or hose; and a dampener for dampening motion of at least one pully of the plurality of first pullies or the plurality of second pullies, or the trolley, and subduing motion of the trolley.

2. The electric vehicle charging station as recited in claim 1, wherein the flexible cable or hose comprises at least one of a power cable, a hydraulic hose, an electrical cable, a signal cable, or a fiber optic cable.

3. The electric vehicle charging station as recited in claim 1, wherein the biasing mechanism comprises at least one of an elastic cord, a spring, an electric actuator, a pneumatic actuator, a hydraulic actuator, or a weight.

4. The electric vehicle charging station as recited in claim 1, further comprising a ratchet that can be configured to allow continuous motion of the trolley only toward the plurality of first pullies while preventing continuous motion of the trolley away from the plurality of first pullies.

5. The electric vehicle charging station as recited in claim 1, wherein the dampener comprises at least one of a shock absorber or an eddy current brake.

6. A retractable cable or hose station comprising:

a guide having a plurality of first pullies fixed with respect to a longitudinally extending track;

a trolley configured to travel along the longitudinally extending track, the trolley having a plurality of second pullies to be positioned in a line with the plurality of first pullies generally parallel to the longitudinally extending track;

a flexible cable or hose configured to be separately looped around individual ones of the plurality of first pullies and individual ones of the plurality of second pullies, the trolley configured to be pulled toward the plurality of first pullies when a free end of the flexible cable or hose is pulled away from the plurality of first pullies; and a dampener for dampening motion of at least one pully of the plurality of first pullies or the plurality of second pullies, or the trolley, and subduing motion of the trolley.

7. The retractable cable or hose station as recited in claim 6, wherein the flexible cable or hose comprises at least one of a power cable, a hydraulic hose, an electrical cable, a signal cable, or a fiber optic cable.

8. The retractable cable or hose station as recited in claim 6, further comprising a biasing mechanism for biasing the trolley away from the plurality of first pullies to tighten and retract the flexible cable or hose.

9. The retractable cable or hose station as recited in claim 8, wherein the biasing mechanism comprises at least one of an elastic cord, a spring, an electric actuator, a pneumatic actuator, a hydraulic actuator, or a weight.

10. The retractable cable or hose station as recited in claim 6, wherein the guide is configured to be oriented vertically to position the plurality of first pullies above the trolley and bias the trolley away from the plurality of first pullies using gravity.

11. The retractable cable or hose station as recited in claim 6, further comprising a ratchet that can be configured to allow continuous motion of the trolley only toward the plurality of first pullies while preventing continuous motion of the trolley away from the plurality of first pullies.

12. The retractable cable or hose station as recited in claim 6, wherein the dampener comprises at least one of a shock absorber or an eddy current brake.

13. A retractable cable or hose station comprising:

a guide having a plurality of first pullies fixed with respect to a longitudinally extending track;

a trolley configured to travel along the longitudinally extending track, the trolley having a plurality of second pullies to be positioned in a line with the plurality of first pullies generally parallel to the longitudinally extending track;

a flexible cable or hose configured to be separately looped around individual ones of the plurality of first pullies and individual ones of the plurality of second pullies, the trolley configured to be pulled toward the plurality of first pullies when a free end of the flexible cable or hose is pulled away from the plurality of first pullies; and a biasing mechanism for biasing the trolley away from the plurality of first pullies to tighten and retract the flexible cable or hose.

14. The retractable cable or hose station as recited in claim 13, wherein the flexible cable or hose comprises at least one of a power cable, a hydraulic hose, an electrical cable, a signal cable, or a fiber optic cable.

15. The retractable cable or hose station as recited in claim 13, wherein the biasing mechanism comprises at least one of an elastic cord, a spring, an electric actuator, a pneumatic actuator, a hydraulic actuator, or a weight.

16. The retractable cable or hose station as recited in claim 13, wherein the guide is configured to be oriented vertically to position the plurality of first pullies above the trolley and bias the trolley away from the plurality of first pullies using gravity.

17. The retractable cable or hose station as recited in claim 13, further comprising a ratchet that can be configured to allow continuous motion of the trolley only toward the plurality of first pullies while preventing continuous motion of the trolley away from the plurality of first pullies.

18. The retractable cable or hose station as recited in claim 13, further comprising a dampener for dampening motion of at least one pully of the plurality of first pullies or the plurality of second pullies, or the trolley, and subduing motion of the trolley.

19. The retractable cable or hose station as recited in claim 18, wherein the dampener comprises at least one of a shock absorber or an eddy current brake.

* * * * *